US00RE39812E

(19) United States
(12) Reissued Patent
Edem et al.

(10) Patent Number: US RE39,812 E
(45) Date of Reissued Patent: Sep. 4, 2007

(54) METHOD AND APPARATUS WHICH ALLOWS DEVICES WITH MULTIPLE PROTOCOL CAPABILITIES TO CONFIGURE TO A COMMON PROTOCOL CONFIGURATION

(75) Inventors: Brian C. Edem, San Jose, CA (US); Srinivas Kola, Milpitas, CA (US)

(73) Assignee: National Semiconductor Corporation, Santa Clara, CA (US)

(21) Appl. No.: 11/192,461

(22) Filed: Jul. 28, 2005

Related U.S. Patent Documents

Reissue of:
(64) Patent No.: 5,586,117
Issued: Dec. 17, 1996
Appl. No.: 08/262,769
Filed: Jun. 20, 1994

U.S. Applications:
(63) Continuation-in-part of application No. 08/146,729, filed on Nov. 1, 1993, now Pat. No. 5,617,418, which is a continuation-in-part of application No. 07/971,018, filed on Nov. 2, 1992, now abandoned.

(51) Int. Cl.
*H04L 12/413* (2006.01)

(52) U.S. Cl. ..... 370/447; 370/462; 370/466
(58) Field of Classification Search ..... 370/447, 370/446, 244, 467; 340/825.56; 375/239; 714/41, 706
See application file for complete search history.

(56) References Cited

U.S. PATENT DOCUMENTS 4,953,210 A 8/1990 McGlynn et al. ..... 375/222
5,311,114 A 5/1994 Sambamurthy et al. .... 370/85.3
5,432,775 A 7/1995 Crayford ..... 370/85.3
5,617,418 A 4/1997 Shirani et al. ..... 370/465

OTHER PUBLICATIONS

"Draft Supplement to IEEE 802.3 Standard", pp. 1–31 (Section 28 et seq.), Jun. 16, 1994, (Appendix 1 filed with the original application.).

"IEEE Link Task Force Autodetect Specification for NWay Autodetect Version 1.0", Six introductory pages plus pp. 1–60, Apr. 10, 1994. (Appendix 2 filed with the original application.).

*Primary Examiner*—Chau Nguyen
*Assistant Examiner*—Ian N. Moore
(74) *Attorney, Agent, or Firm*—Girard & Equitz LLP

(57) ABSTRACT

An apparatus matches the configuration of a first station of a local area network to the configuration of the second station of the local area network. The first station detects a protocol advertisement from the second station that indicates a protocol in which the second station is capable of operating. The first station compares the indicated protocol of the second station to a protocol in which the first station is capable of operating. The first station determines, when the result of the comparison is negative, which of the first station and the second station is a higher priority station. The first station advertises, to the second station, a protocol capability of the first station, The first station changes the advertised protocol capability of the first station when it is determined that the first station is the higher priority station. The first station waits for the advertised protocol capability of the second station to change when it is determined that the second station is the higher priority station.

43 Claims, 15 Drawing Sheets

| # | Parameter | Min | Typ | Max | units |
|---|---|---|---|---|---|
| T1 | Clock/Date Pulse Width | | 100 | | ns |
| T2 | Clock Pulse to Clock Pulse | | 125 | | µs |
| T3 | Clock Pulse to Data Pulse (Data=1) | | 62.5 | | µs |
| T4 | Pulses in a Burst | 17 | | 33 | # |
| T5 | Burst Width | | 2 | | ms |
| T6 | Burst to Burst | 8 | 16 | 24 | ms |

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| NP | RF | A7 | A6 | A5 | A4 | A3 | A2 | A1 | A0 | Ack | S4 | S3 | S2 | S1 | S0 |
| | | Technology Ability Field | | | | | | | | | Selector Field | | | | |

FIG. 6

| D10 | D9 | D8 | D7 | D6 | Description |
|---|---|---|---|---|---|
| 0 | 0 | 0 | 0 | 1 | 10BASE–T |
| 0 | 0 | 0 | 1 | 0 | 10BASE–T Full Duplex |
| 0 | 0 | 1 | 0 | 0 | 100BASE–TX |
| 0 | 1 | 0 | 0 | 0 | 100BASE–TX Full Duplex |
| 1 | 0 | 0 | 0 | 0 | 100BASE–T4 |

FIG. 7

| D10 | D9 | D8 | D7 | D6 | Description |
|---|---|---|---|---|---|
| 0 | 0 | 0 | 1 | 1 | Regular and Full Duplex 10BASE–T |
| 1 | 0 | 1 | 0 | 1 | 10BASE–T, 100BASE–TX, and 100BASE–T4 all supported in normal configurations. |
| 0 | 0 | 1 | 0 | 1 | 10BASE–T and 100BASE–TX configurations both supported. |
| 1 | 1 | 1 | 0 | 0 | 100BASE–TX,100BASE–T4,100BASE–TX Full Duplex supported. |

FIG. 8

Note • Ability_match is 3 consecutive data pattern match, ignoring acknowledgment bit.
• Acknowledge_match is 3 consecutive data patterns having acknowledgment bit set.
• ack_cnt_done is from FLP Transmit SM to indicate completion of sending a minimum of 4–16 acknowledge patterns.
• optional remote sensing capability, refer to Management support section.

Note:
- transmit_ack & transmit_capability are signals from FLP Arbitration SM
- ack_cnt is the number of acknowledgment patterns sent (4–16 minimum)
- bit_cnt is the number of data bits sent for each pattern (16)
- internal_timer defines the delay between clock and a data bit (62.5+/−15uS)
- transmit_link_pulse_timer defines the delay between two consecutive FLP bursts (14+/−8mS).

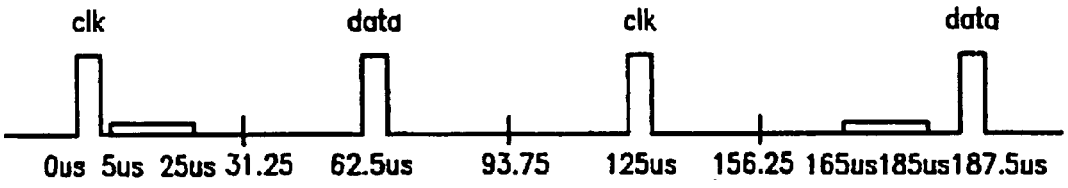
FIG. 13
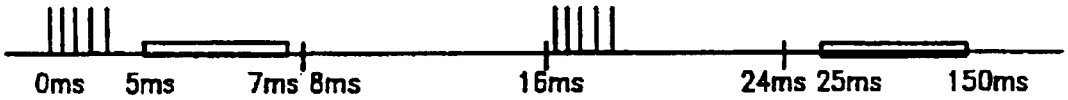
FIG. 14
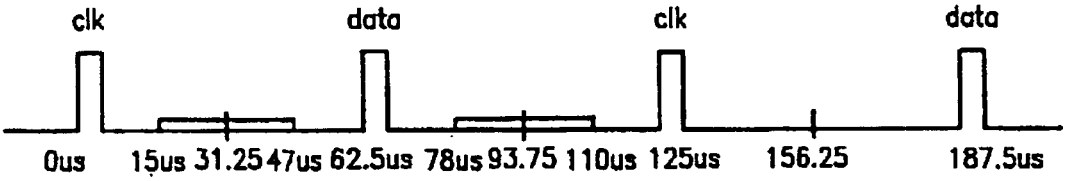
FIG. 15
| Parameter | Min | Typ | Max | units |
|---|---|---|---|---|
| FLP_test_min_timer | 5 | | 25 | us |
| FLP_test_max_timer | 165 | | 185 | us |
| Link_test_min_timer | 5 | | 7 | ms |
| Link_test_max_timer | 50 | | 150 | ms |
| Data_detect_min_timer | 15 | | 47 | us |
| Data_detect_max_timer | 78 | | 110 | us |
FIG. 16

METHOD AND APPARATUS WHICH ALLOWS DEVICES WITH MULTIPLE PROTOCOL CAPABILITIES TO CONFIGURE TO A COMMON PROTOCOL CONFIGURATION

Matter enclosed in heavy brackets [ ] appears in the original patent but forms no part of this reissue specification; matter printed in italics indicates the additions made by reissue.

RELATED APPLICATIONS

This application is a Continuation-In-Part of copending application Ser. No. 08/146,729, filed Nov. 1, 1993, for "Network Link Detection and Generation" which is a Continuation-In-Part of application Ser. No. 07/971,018, filed Nov. 2, 1992, abandoned, for "Network Link Endpoint Capability Detection."

TECHNICAL FIELD OF THE INVENTION

The present invention relates to local area networks, and in particular, to methods and apparatus which allows devices with multiple protocol capabilities to configure for a common protocol configuration.

BACKGROUND OF THE INVENTION

The IEEE 802.3 standard defines Carrier Sense Multiple Access/Collision Detection (CSMA/CD) as its Media Access Control (MAC) protocol for Ethernet local area networks (LAN's). A station connected to an Ethernet LAN may be fixedly configured to communicate with other stations of the LAN in a single mode (e.g. 10BASE-T, 10BASE-T Full Duplex, 100BASE-TX, 100BASE-TX Full Duplex, and 100BASE-T4), or the communication mode of the station may be changeable to match the configuration of the other stations. In any case, the communication mode of a particular station must match the communication mode of another station before communication can take place between the two stations.

The proliferation of CSMA/CD-based LANs will spawn a new generation of multi-function hubs and nodes. The trend among hub vendors towards "virtual networks" wherein ports can be switched between LANs will necessitate that, without an auto-negotiation solution such as is provided by the present invention, users and information services managers will face difficult configuration management problems in the future.

The necessity for providing in a station means for automatically detecting the communication capabilities of other stations in a network has been recognized. A method and apparatus for performing such automatic detection is the subject of copending patent application Ser. No. 08/146,729, filed and assigned to National Semiconductor Corporation, the assignee of the present application. As described in the copending application, each of two connected stations communicates to the other station, via Fast Link Pulses, its respective communication capabilities. When each station has detected the other stations capabilities, the stations each automatically change to a configuration which provides the highest common denominator of capabilities.

However, the technology of LAN's is evolving such that manufacturers of LAN's will be providing stations which will are reconfigurable to support any of multiple protocols.

SUMMARY OF THE INVENTION

The present invention provides a method and apparatus which allows multi-protocol stations to automatically detect the protocols under which other stations can communicate, and for the connected stations to together select a common communication protocol.

The present invention solves the problem of configuring the growing available matrix for RJ-45 CSMA/CD compatible LANs by providing a simple, robust scheme to advertise, detect and resolve the capabilities of two stations connected with UTP. With the present invention, the upgrade occurs automatically and seamlessly from 10BASE-T to desired higher performance modes without requiring the presence of a management agent.

The present invention interoperates with all 10BASE-T compatible devices such that the installed network base will not be affected by the new generation of RJ-45 LAN technologies if NWay is adopted as a standard. NWay can be applied universally across node and hub products because the architecture is symmetric in nature and does not establish a master/slave hierarchy.

A low gate count and simple architecture make the present invention both easy to understand and cost effective. The cost and complexity are realistically bounded by providing a rich enough code space to meet the current projected higher performance mode and figure LAN technology needs. Although this protocol addresses the problem for CSMA/CD protocol LANs, it should be understood that other technologies can benefit from the use of this communication mechanism.

The present invention also provides a powerful management tool which allows:

1. Manual override of auto-negotiation;
2. Renegotiation on management intervention;
3. Remote Fault Sensing;
4. Parallel Advertisement of capabilities; and
5. Storage of remote capabilities.

The negotiation time is bounded for good links sufficiently to ensure that popular network protocol connections do not time out. Even in a noise UTP environment, the handshaking and redundant pattern comparison ensures robust operation.

A better understanding of the features and advantages of the invention will be obtained by reference to the following detailed description and accompanying drawings which set forth an illustrative embodiment in which the principles of the invention are utilized.

BRIEF DESCRIPTION OF THE FIGURES

FIG. 6 illustrates a possible link code word encoding.

FIG. 7 shows a possible Technology Ability Field encoding when the selector field value indicates a CSMA/CD compatible protocol.

FIG. 8 shows, for the selector field indicating a CSMA/CD compatible protocol, examples of how multiple technologies are advertised simultaneously.

FIG. 13 illustrates the application of the FLP Detect Timers.

FIG. 14 illustrates the operation of the FLP Burst Timer.

FIG. 15 illustrates the operation of FLP Data Detect Timers.

FIG. 16 is a table which summarizes the timer minimum and maximum values.

FIG. 18 shows the case in which the 10BASE-T only station begins receiving FLPs in between bursts.

FIG. 19 shows the case in which the 10BASE-T only station begins receiving FLPs just before the last pulse in an FLP burst.

FIG. 23 and 23A–23C are a flowchart of a protocol arbitration resolution algorithm (PARA) in accordance with the present invention.

DETAILED DESCRIPTION OF THE INVENTION

Figure 1:
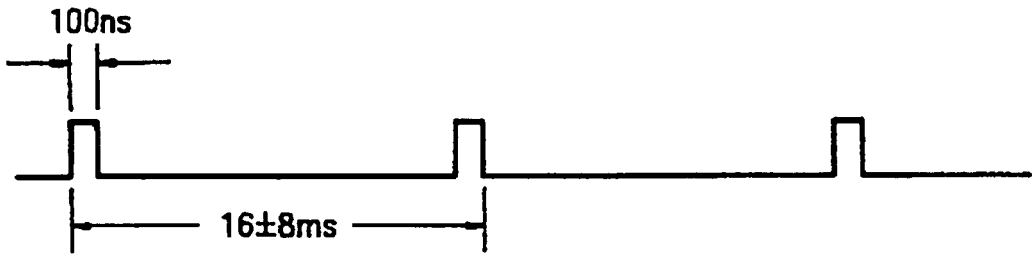
FIG. 1 illustrates normal link pulse (NLP) timing.

In the CSMA/CD protocol, as defined in IEEE 802.3, a 10BASE-T Normal Link Pulse (NLP) is applied on a network link segment to assist stations connected to the segment in determining the segment's integrity. Such a Link Pulse scheme is known in the art. As shown in FIG. 1, an NLP has a nominal pulse width of 100 ns. The pulses are transmitted every 16 ms +/− 8 ms while the segment is active, but not transmitting regular packet data (i.e. in an IDLE mode).

NLP's are used to control a station's entry to and exit from a Link Loss State. That is, a station enters Link_Loss_State when no NLP's are received by the station for more than link loss timer time. Link_loss_timer time typically ranges from 50 ms to 150 ms. A station exits Link_Loss_State when it detects a number of NLP's, typically two to ten.

Figure 2:
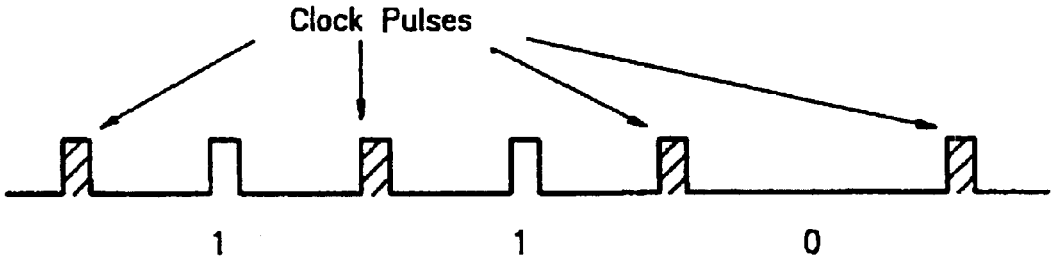
FIG. 2 illustrates the timing of fast link pulse (FLP) bursts.

The present invention substitutes a Fast Link Pulse Burst (FLP) for a single 10BASE-T NLP. An FLP burst, as shown in FIG. 2, consists of a maximum of 33 pulses. The 33 pulses are a combination of 17 clock pulses, with an optional data pulse being interleaved between each pair of adjacent clock pulses. In this manner, 16 data bits can be transmitted in each FLP burst—a 1 data bit is encoded as a data pulse between a pair of adjacent clock pulses, and a 0 data bit is encoded as the absence of a data bit between the pair of adjacent clock pulses.

Figure 3:
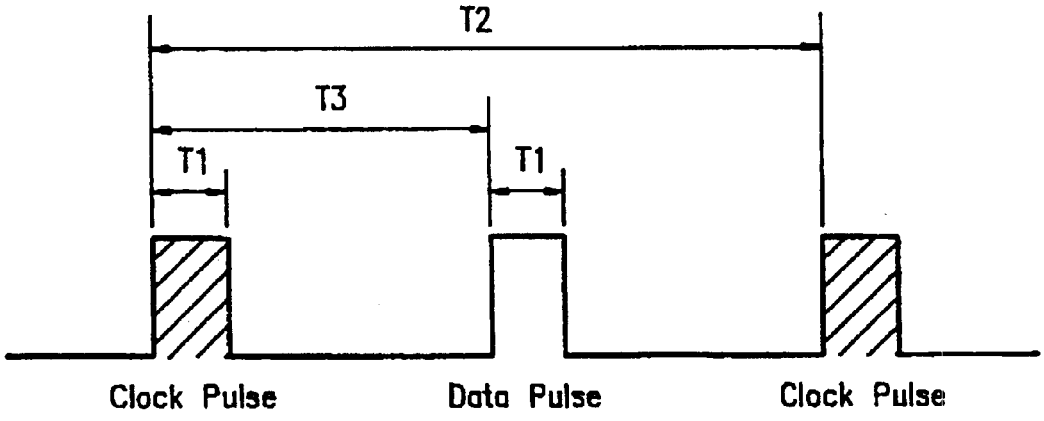
FIGS. 3, 4, and 5 summarize the FLP pulse and burst timing.
Figures 4, 5:
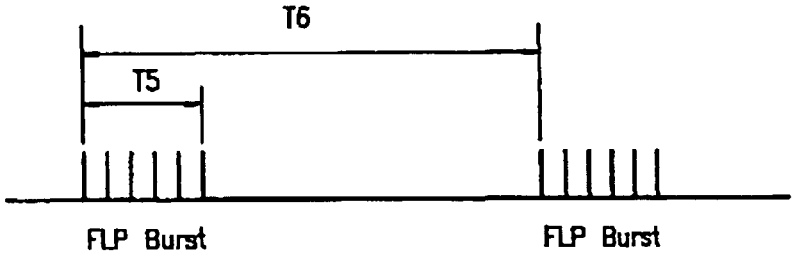

Individual pulses in an FLP burst have the same 100 ns width as NLP's, with both clock and data pulses having the same width. Clock pulses are spaced apart by 125 μsecs. Data bits, if present, are centered between a pair of adjacent clock pulses. FIGS. 3, 4, and 5 summarize the FLP pulse and burst timing.

In accordance with an embodiment of the present invention, a method and apparatus are provided which allows a station at one end of a LAN link segment to advertise the protocols, and modes within those protocols, in which it can operate, and to likewise detect the protocols and modes in which a remote station at the other end of the link segment can operate (or at least those protocols and modes that the station at the other end of the link segment is advertising). The communication of modes takes place via the data communicated in a 16-bit "link code word" encoded in FLP bursts, as described above.

FIG. 6 illustrates a possible link code word encoding. Bits D0–D4 denote a "Selector Field" which indicates a particular protocol under which the station advertising the link code word can communicate. Bit D5 denotes an "Acknowledge Bit". A station sets this bit in the link code word it is advertising when it has successfully received the remote station's link code word. Bits D6–D13 denote a "Technology Ability Field". These bits are mapped to individual technologies such that abilities are advertised in parallel for each selector field value. Also, multiple technologies may be advertised simultaneously by simultaneously setting the bits in the Technology Ability Field that correspond to the technologies. FIG. 7 shows a possible Technology Ability Field encoding when the selector field value indicates a CSMA/CD compatible protocol. FIG. 8 shows, for the selector field indicating a CSMA/CD compatible protocol, examples of how multiple technologies are advertised simultaneously. Bits D11–D14 are reserved for future use; these bits should be masked out upon reception of the link code word. Bit D15 is a "Next Page Bit" which provides a mechanism to transmit additional protocol and capability information in the link code word. That is, the Next Page Bit being set indicates that the other bits of the link code word contain protocol- and/or capability-specific information.

The present invention further provides a method and apparatus for using the protocol and capability information advertised in link code words communicated between two stations on a LAN link, of which one or both of the stations are multi-protocol/multi-capable, for each station to automatically detect the other stations advertised protocol/configuration capabilities and further automatically agree on a protocol/configuration under which the stations can interoperate. Upon completion of the auto-agreement, each station configures its link, in accordance with the results of the auto-agreement, for interoperation with the other link.

Figure 9:
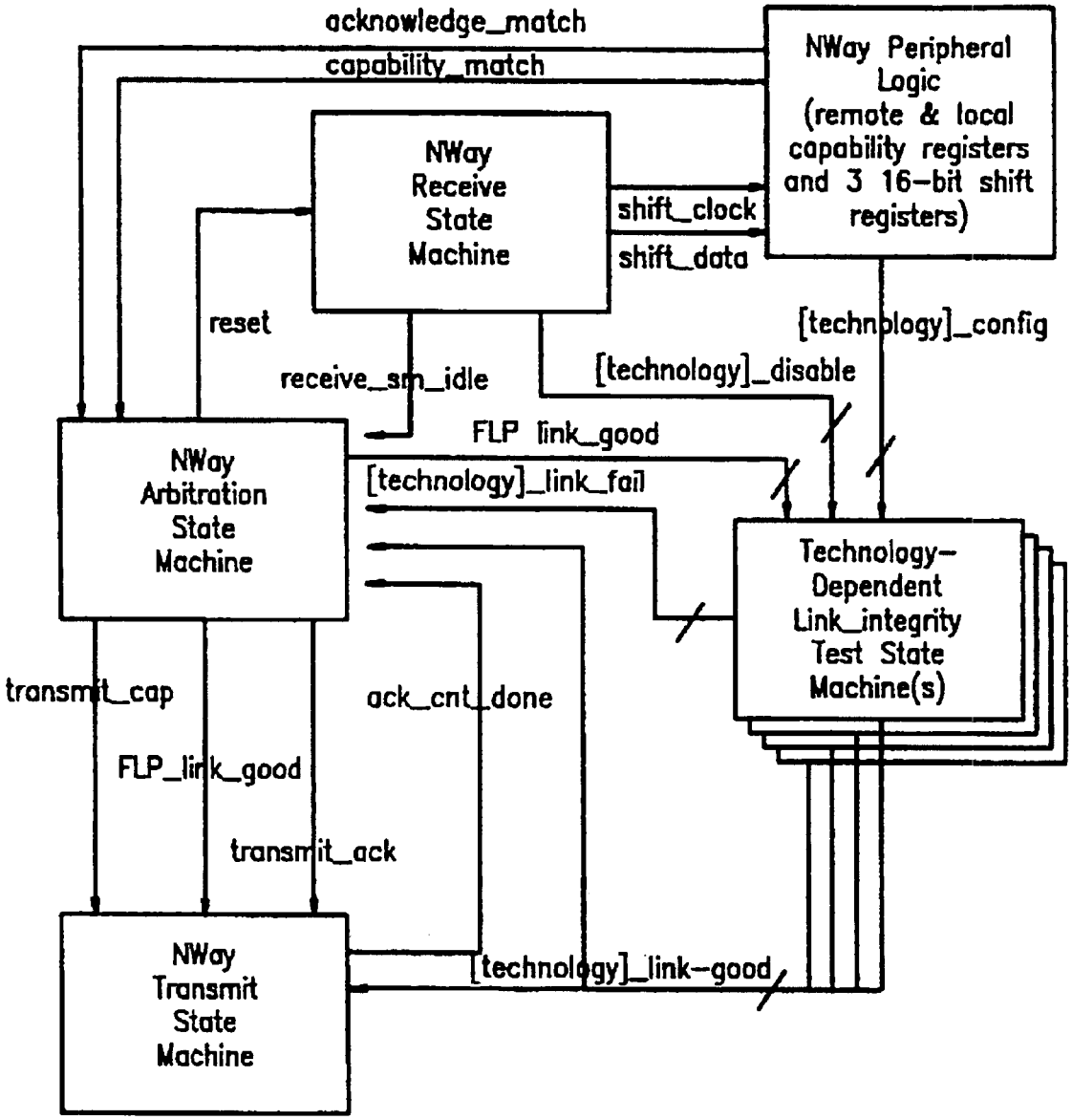
FIG. 9 is a block-level diagram that illustrates how the protocol/configuration auto-agreement mechanism is implemented within each station.

FIG. 9 is a block-level diagram that illustrates how the protocol/configuration auto-agreement mechanism is implemented within each station. Preferably, the auto-agreement mechanism operates symmetrically so that a single implementation can be used in any multi-protocol/multi-capable station. In this way, both stations are on equal footing in the auto-negotiation process, with neither station being a "master" or "slave".

FIG. 9 illustrates the relationship between four state machines which are used to implement the auto-agreement mechanism within a station. An Arbitration State Machine controls the overall protocol/capability exchange process within the station, using and guiding the Transmit State Machine and the Receive State Machine. The Transmit State Machine controls the transmission of station protocol/capabilities using FLP bursts. The Receive State Machine controls the receipt of individual clock and data pulses within a Fast Link Pulse burst. A 10BASE-T Link Pulse State Machine controls the reception and transmission of NLP's when the station is communicating with a 10BASE-T station.

Finally, a Technology Dependent Link Integrity Test State Machine (or Machines) may co-exist with the auto-agreement scheme. For example, the Technology Dependent Link Integrity Test State Machine may be a 100BASE-TX Link Test-Fail State Machine which controls the reset logic for the Convergence Sub-Layer of the 100BASE-TX standard. When in Link_Fail, the Idle Line State is continuously sent.

Each of the auto-agreement state machines are now described in detail.

Figure 10:
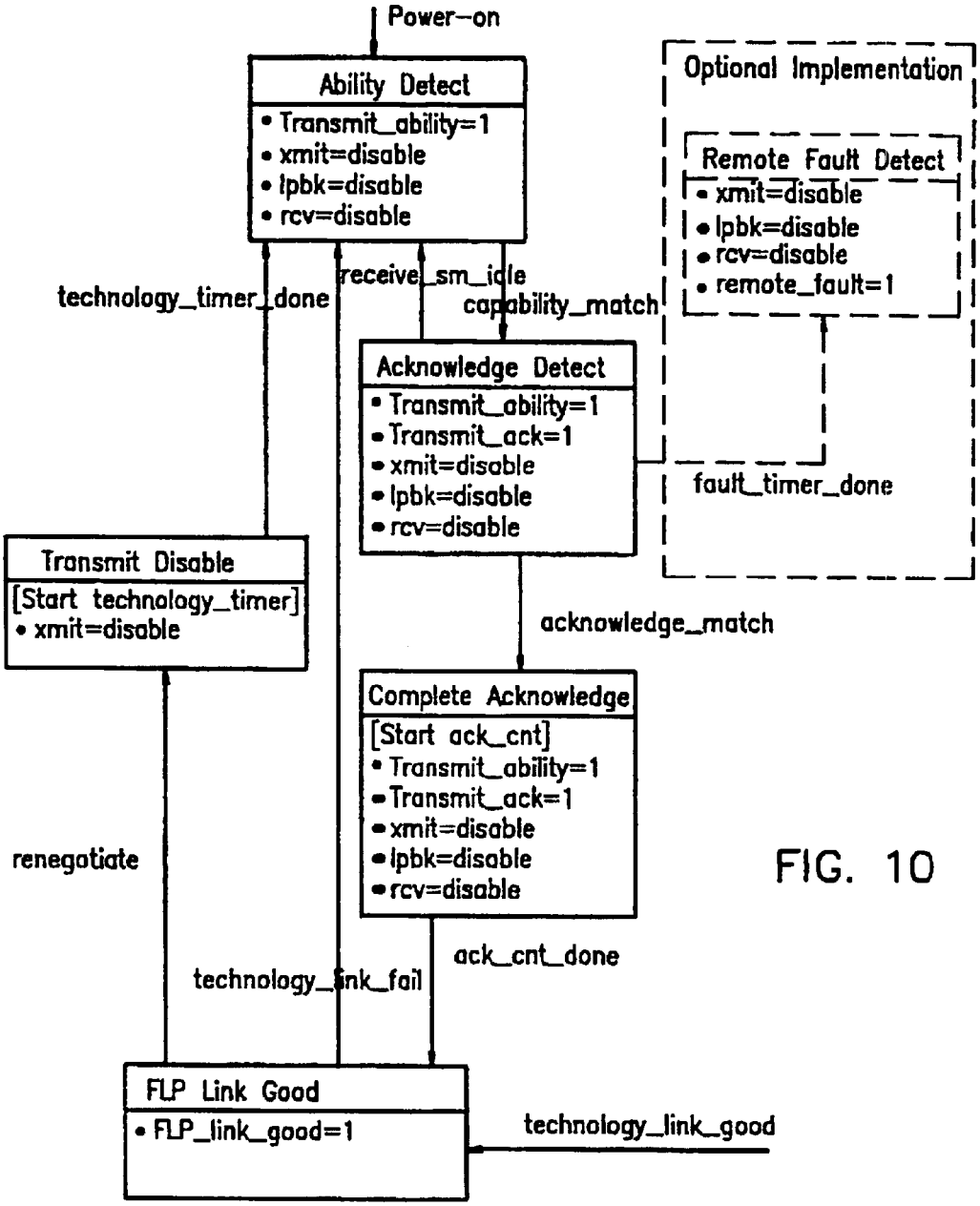
FIG. 10 shows the arbitration state machine.

The arbitration state machine is shown in FIG. 10. The purpose of this state machine is to control the FLP transmit state machine and determine if a remote station has its technology abilities, either through FLPs or through a technology-dependent signalling scheme. At power on, or upon the assertion of technology-dependent link-fail condition, this state machine moves into Capability Detect state to allow the FLP transmit state machine to start sending FLP bursts containing the local station's technology abilities to the far-end station. The results of FLP receive state machine are to be used to determine technology ability match.

A technology ability match occurs when this state machine is in Ability Detect state, and three consecutive FLP bursts contain the same pattern ignoring the acknowledge bit. Once a capability match occurs, the FLP arbitration state machine moves into Acknowledge Detect state.

In Acknowledge Detect state, it transmits the same data pattern with the acknowledge bit set, to indicate to the far-end station that it has captured its technology abilities.

In the case of unexplained loss of FLP bursts coming from the far-end station, under which the FLP receive state machine goes to IDLE state, this state machine goes back to Ability Detect state to restart negotiation from scratch. While remaining in the Acknowledge Detect state, it waits to receive acknowledge_match from the far-end station. Acknowledge_match occurs when two out of three consecutive FLP bursts received have the acknowledge bit set. In order to guarantee that the far-end station has completed acknowledge_match, a minimum of 4–6 acknowledge patterns are transmitted. Subsequently, it transitions to FLP_link_good state. After this point, the technology-specific link signalling scheme takes over, if needed for the specific technology (e.g., 100BASE-TX, 100BASE-T4). If this technology-specific link signalling scheme does not successfully complete in a technology determined period of time, then technology_link_fail is asserted, and the Arbitration State Machine starts renegotiation.

If the far-end station does not detect and transmit FLP bursts, and instead sends a technology-dependent signal (e.g., 10BASE-T link pulses, or 100BASE-TX Idle Line State transmissions), the technology-dependent_link_good signal thereby halting FLP burst transmits.

In addition, upon successful establishment of technology-dependent link, the technology-dependent link integrity test state machine goes to link fail and the arbitration state machine goes back to the Ability Detect state.

A higher-level management agent can start a renegotiation of technology abilities with the far-end station by asserting the renegotiate signal. The state machine moves into Transmit Disable state to wait for the far-end station to go into a link-fail state and then starts FLP burst transmissions.

Figure 11:
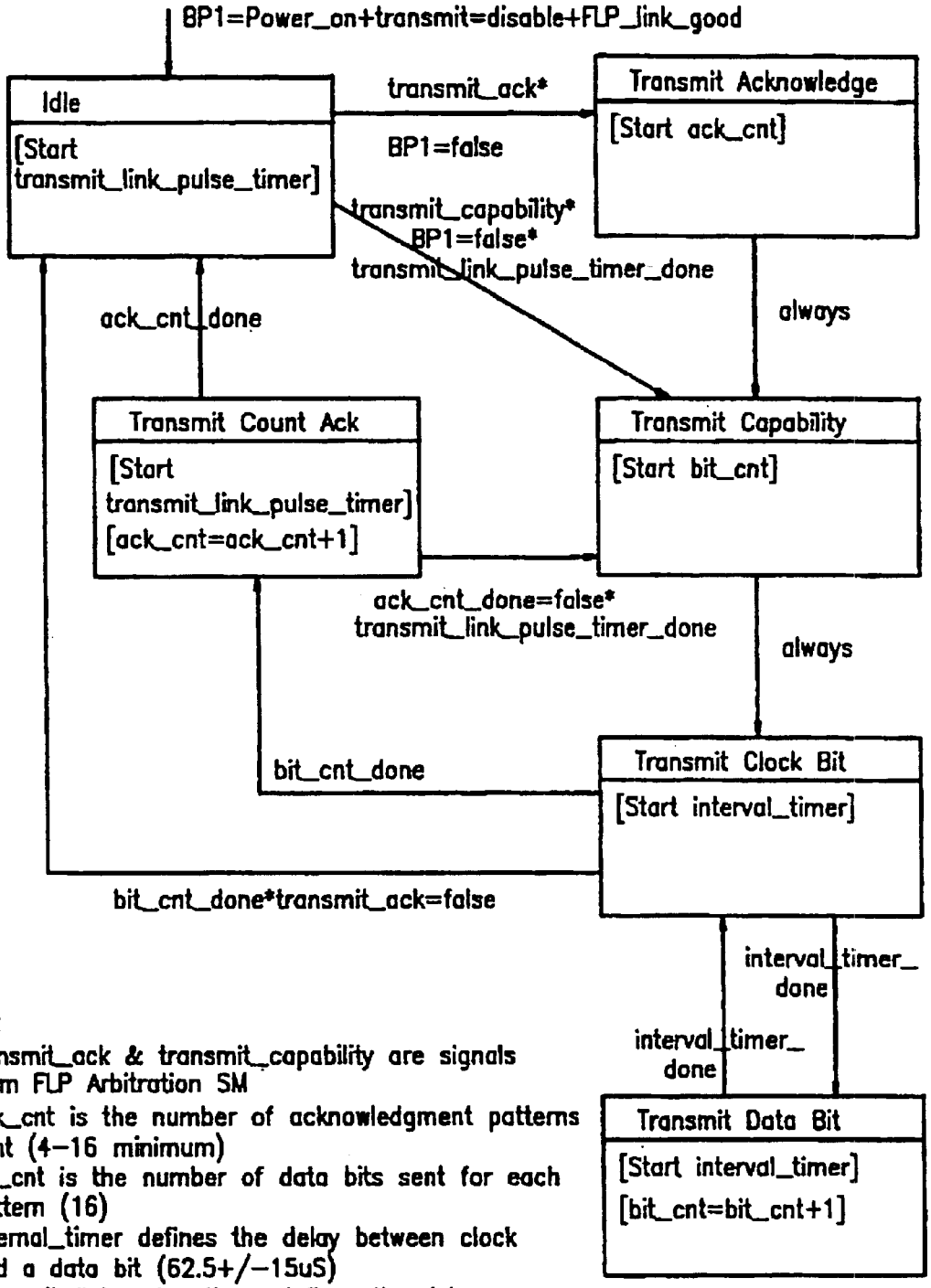
FIG. 11 shows the Transmit state machine.

The Transmit state machine is shown in FIG. 11. The purpose of this state machine is to transmit a sequence of 33 fast link-pulses to the far-end station, when instructed by the arbitration state machine. The idle stats is entered at power-on and this state machine transitions to this state if the arbitration state machine is in the FLP_link_good state.

The transmit_link_pulse_timer (14+/− 8 msec) is used to separate two consecutive fast link-pulse bursts transmitted.

If the arbitration state machine is in the process of sending the capability to the far-end station, then the transmit state machine enters into the Transmit_Capability state. If acknowledgement is to be sent, then the state machine enters Transmit_Acknowledge state to initialize ack_cnt (416), and then it moves to Transmit_Capability state. In this state, the bit_cnt is started to keep track of the 16 bits of data to be transmitted.

The state machine then alternates between the Transmit_Clock_Bit state and Transmit_Data_Bit state to transmit clock bit and to transmit data bit (if the data bit to be transmitted is logic one) respectively. The interval_timer (62.5+/− 15 μs) is used to separate a clock bet and a data bit.

Once all 16 bits of data are transmitted, if the state machine is in the midst of sending acknowledgement patterns then the state machine moves to the Transmit_Count_Ack state. However, after 16 bits of data transmission, if the state machine is not in the midst of sending acknowledgement patterns, then the state machine moves to idle directly.

The state machine returns to idle after a 16-bit capability has been transmitted. In the Transmit_Count_Ack state, if 4–6 acknowledgement patterns have been sent, it goes back to idle, otherwise it waits for 14+/8 msec and moves to Transmit_Capability state to send the next burst of 16-bit acknowledgement pattern.

Figure 12:
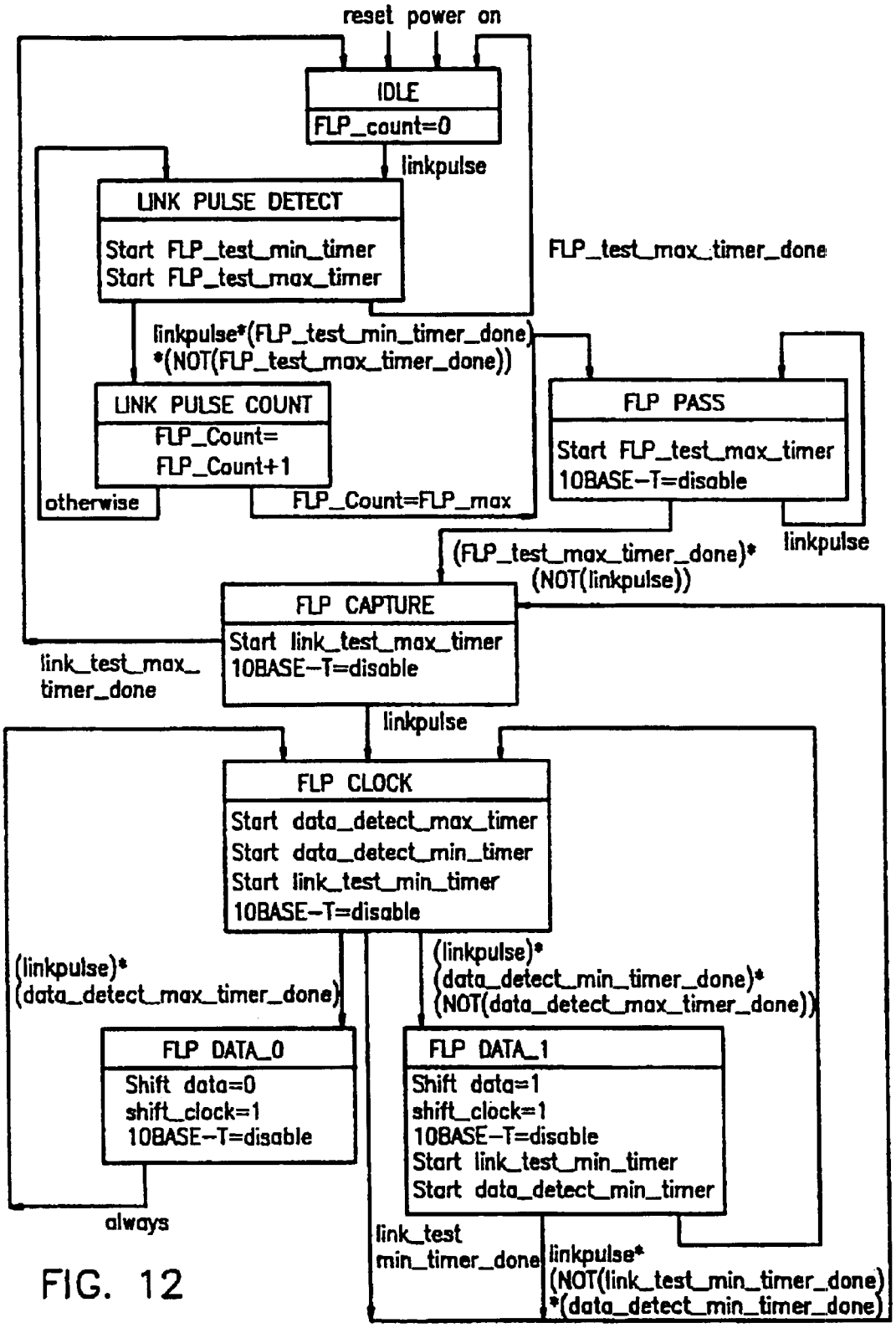
FIG. 12 shows the Receive state machine.

The Receive state machine is shown in FIG. 12. This state machine is used to identify that the link pulses received are fast-link-pulse bursts, and if so, to store the embedded 16-bit data in a shift-register. A burst of thirty-three link pulses separated by 62.5 uS conveys the capability of the far-end station. A link pulse is considered part of a FLP burst if it occurs within a certain time of the previous link-pulse. It is detected by the use of the two timers: FLP_test_min_timer and FLP_test_max_timer. The purpose of the FLP_test_min_timer is to mask out any noise or ringing effects on the line. The FLP_test_max_timer is used to determine whether the next link-pulse received is within a window to be of fast-link-pulse category.

FIG. 13 illustrates the application of the FLP Detect Timers (FLP_test_min/max_timers). The Link Receive state machine goes to the idle state at power-on or when the arbitration state machine forces it to this state. When the Link Receive state machine is in idle state, a reception of a link-pulse causes a transition to the Link_Pulse_Detect state.

At this point, both the FLP_test_min_timer and FLP_test_max _timer are started. The FLP_test_min_timer has a value of 5 to 25 μs. The FLP_test_max_timer has a value of 165 to 185 μs. If another link-pulse is received in the window of time such that the FLP_test_min_timer has timed out, but the FLP_test_max_timer has not completed, the state machine makes a transition to Link_Pulse_Count state.

In the Link_Pulse_Count state, FLP_count is incremented. If consecutive number of fast link pulses are received, i.e., the FLP_count equals FLP_count_max (6 to 8), then the far-end station is considered FLP capable, and all Technology-Specific link integrity test state machines (e.g., 10BASE-T link_integrity_test_state machine) are forced into Freeze state.

The Receive state machine then goes into a FLP_Pass state to ignore the rest of the incoming fast link-pulse burst.

This is accomplished by waiting for the idle interval after the last link pulse of the current burst, i.e., an idle period of 165 to 185 μs has been observed. At this time, the state machine transitions into FLP-Capture state, and is ready to capture a complete burst of fast link pulses from the far-end station.

In the FLP-capture state, the link_test_max_timer (25–150 msec.) is started to insure that link pulse bursts are received within this window. When this timer expires, the state machine moves to the idle state to indicate the absence of FLP bursts.

FIG. 14 illustrates the operation of the FLP Burst Timer (Link_test_min/max_timers). The first link-pulse received in the FLP_capture state is interpreted as a clock bit. Two consecutive clock bits can envelop a data bit. The presence of a data bit is interpreted as a logic one for the corresponding data bit field of the shift register. The absence of the data bit is interpreted as a logic zero for the corresponding data bit field of the shift register. Two consecutive clock pulses are separated by 125+/− 15 μs. The separation of a subsequent data bit from a clock bit is 62.5+/−15 μs. These margins are designed to by symmetric for both local and far-end stations.

In the FLP_Clock state, the data_detect_min_timer (15 to 47 μs) and data_detect_max_timer (78 to 110 μs) are started. If a link-pulse is received when the data_detect_max_timer has completed and data_detect_max_timer is not, it is interpreted as a data-bit of logic one. On the other hand, if the next clock_bit arrives, as indicated by data_detect_max_timer_done, then the embedded data bit is assumed to be zero. In the FLP_Clock state, the link_test_min_timer (5 to 7 msec) is also started; this timer is used to separate two consecutive fast-link pulse bursts.

FIG. 15 illustrates the operation of FLP Data Detect Timers (Data_detect_min/max_timers). The FLP_Data_0 state, a logic zero is shifted into the shift register. In FLP_Data_1 state, a logic one is shifted into the shift register and upon the reception of the next clock-bit, the state machine moves back to FLP_Clock state. Either upon the reception of the last clock bit, or due to a bit error corrupting the last clock but, the state machine moves to FLP_Capture state.

FIG. 16 is a table which summarizes the timer minimum and maximum values.

The only technology-specific state machine that is required is the 10BASE-T link integrity test state machine. This state machine is required for compatibility with existing 10BASE-T nodes.

Two modifications must be made to the original 10BASE-T link integrity test state machine. The first modification is that the state machine must power-up in the Link_Test_Fail_Reset state.

The second modification needed to the original 10BASE-T link integrity test state machine is to add another state called Freeze 10BASE-T. This state is entered upon the recognition of the far-end station's FLP capability and remains in this state during the negotiation phase. After the NWay negotiation is successfully completed, and the highest common denominator is determined to be 10BASE-T, the 10BASE-T Link integrity test state machine moves into the Link_test_pass_state. The state machine remains in the Freeze_10BASE-T state if the mode of communication selected is not 10BASE-T.

Additional technology-specific state machines can be added to implement technology-specific link testing.

The Peripheral Logic Block/Management Interface contains the following:

1) Three 16-bit shift registers to hold the received 16-bit capability information from the far-end station
2) a 2-bit counter to select the current shift-register of the above-mentioned three, in which the data-bits are being shifted,
3) a 16-bit local capability register,
4) a 16-bit far-end capability register,
5) combinational gates to generate:
   capability_match signal for arbitration state machine,
   acknowledge_match signal for arbitration state machine,
   highest-common-denominator.

The next two sections provide the Technology Bit Field Assignments and Priority Resolution Table for the Message Selector.

Two nodes can have multiple abilities in common. In accordance with one embodiment of the present invention a prioritization scheme exists to ensure that the highest common denominator ability is chosen. For example, the following priority may be used (from highest to lowest priority):

1) 100BASE-TX Full Duplex;
2) 100BASE-T4;
3) 100BASE-TX;
4) 10BASE-T Full Duplex; and
5) 10BASE-T.

The rationale for this hierarchy is straightforward. 10BASE-T is the lowest common denominator and therefore that the lowest priority. Full Duplex solutions are always higher in priority than their Half Duplex counterparts. 100BASE-T4 is ahead of 100BASE-TX because 100BASE-T4 runs across a broader spectrum of copper cabling.

Operational Examples

The following operational examples highlight the steps that are taken when attempting to establish a network connection between two nodes. Only three general cases are necessary to demonstrate all the different combinations of operation that will ever occur. The three cases are any auto-detect capable device to 10BASE-T, any auto-detect capable device to another auto-detect capable device, and any auto-detect capable device to a non-auto-detect capable device. All these examples fall into one of these three cases.

Figure 17:
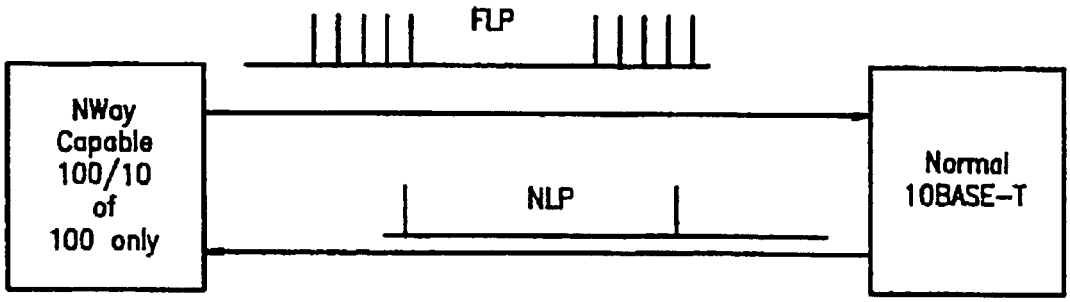
FIG. 17–19 illustrates an example of how an NWay Capable station negotiates with a station that is only capable of 10BASE-T and that is in Link_Fail State.

Case 1: NWay Capable < - - - > 10BASE-T in Link_Fail State (FIG. 17)

This example highlights the invention's 100% backward compatibility with 10BASE-T. The 10BASE-T station in this example begins in the Link_Fail state and is transmitting Normal Link Pulses. The auto-detect capable station supports an arbitrary 100 Mb/sll 10BASE-T capable or 100 Mb/s only capable node. Initially the NWay capable station comes up in the Link_Fail state and transmits FLP bursts to advertise its technology ability.

The normal 10BASE-T node receives the FLP's and remains in Link_Fail state because the timing of the FLP's do not allow a normal 10BASE-T station to misinterpret FLPs as Normal Link Pulses. To understand this, there are two main cases to consider.

Figure 18:
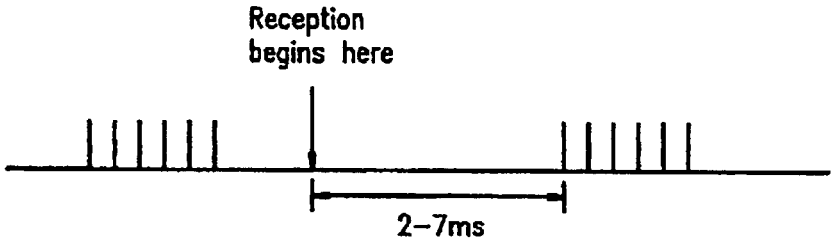

In the first case, shown in FIG. 18, the 10BASE-T only station begins receiving FLPs in between bursts. The link_test_min_timer (2–7 ms) expires and the first pulse in an FLP burst gets counted as a good link pulse. However, subsequent pulses in the FLP burst arrive before the link_test_min_timer expires for a second time which resets the good link pulse counter to zero.

Figure 19:
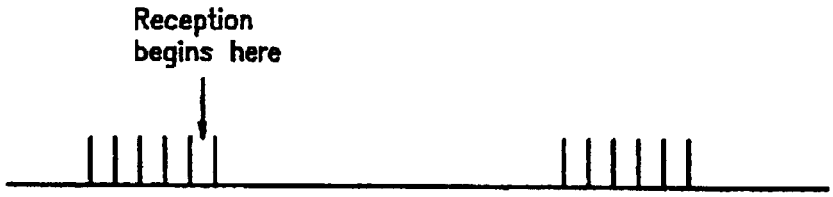

In the second case, shown in FIG. 19, the 10BASE-T only station begins receiving FLPs just before the last pulse in an FLP burst. This pulse is not counted as a good link pulse because the link_test_min_timer has not expired yet. This pulse therefore keeps the good link pulse counter reset at zero. This case then proceeds like the first case.

No scenario causes the good link pulse counter to count higher than 1, which is less than the 2 to 10 required good link pulse specification, so the 10BASE-T only station will never mistakenly enter the Link_Pass state.

The 10BASE-T Link Integrity Test state machine is a required part of the auto-detect, regardless of 10BASE-T data transmit/receive capability. The NWay capable 100/10 node recognizes the NLPs being sent by the normal 10BASE-T node, switches over to 10BASE-T operation, and sends NLPs. The two stations then both communicate in 10BASE-T mode. If the auto-detect capable station is 100 Mb/s only, then it must still recognize 10BASE-T NLPs being sent. In response to NLPs, FLP burst transmission is halted and no NLPs are transmitted by the 100 Mb/s only station.

Figure 20:
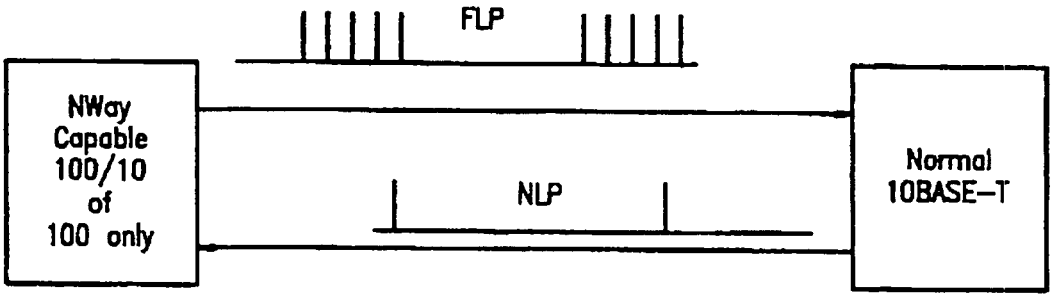
FIG. 20 illustrates an example of how an Auto-Detect Capable station negotiates with a station that is only capable of 10BASE-T and that is in Link_Fail State.

Case 2: Auto-Detect Capable < - - - > 10BASE-T only in Link_Fail State (FIG. 20)

This example highlights auto-detect's 100% backward compatibility with 10BASE-T. The 10BASE-T station in this example begins in Link_Pass state and is transmitting Normal Link. Pulses or normal 10BASE-T traffic. The auto-detect capable station is an arbitrary 100 Mb/sll 10BASE-T capable or 100 Mb/s capable station. Initially the auto-detect capable station comes up in Link_Fail state and transmits Fast Link Pulses to advertise its technology abilities.

The Normal 10BASE-T node receives the Fast Link Pulses and always remains in Link_Pass state because the link_loss_timer does not expire.

The auto-detect capable node's 10BASE-T specific link integrity test state machine identifies the link as being good due to receipt of 10BASE-T traffic or normal link pulses.

If no 10BASE-T data transmit/receive capability exists, then FLP bursts are halted, and no NLPs are transmitted by the auto-detect capable station, otherwise NLPs are transmitted and the link is established.

If some 10BASE-T Link Integrity Test state machine implementations transition from Link Pass state to Link Fail state due to FLPs, we are back to the previous auto-detect capable < - - - > 10BASE-T in Link Fail state example.

Figure 21:
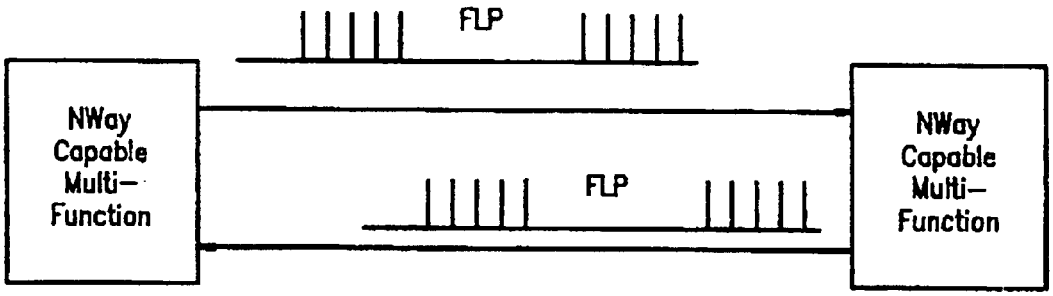
FIG. 21 illustrates negotiation between two Auto-Detect Capable stations that have multiple Common Capabilities.

Case 3: Auto-Detect Capable Connection With Multiple Common Capabilities (FIG. 21)

This example highlights auto-detect capable station to auto-detect capable station auto-negotiation when multiple common technology abilities are supported by both stations. In this case it is assumed that both stations support Full Duplex 100BASE-TX, 100BASE-T4 and 10BASE-T.

Both nodes come up in Link_Fail state and transmit FLP bursts encoded with their technology abilities. Each node learns its partners' technology abilities. In this case each node learns that it has Full Duplex 100BASE-TX, 100BASE-T4 and 10BASE-T in common.

The built-in priority resolution table in each node indicates that full Duplex 100BASE-TX is the highest common denominator technology ability, so both nodes switch over to this technology ability and begin transmission.

Figure 22:
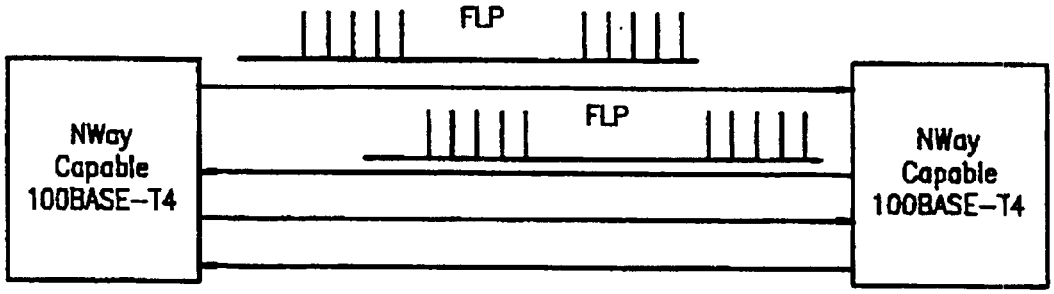
FIG. 22 illustrates negotiation between two 100BASE-T4 auto-detect capable stations.

Case 4: Auto-Detect Capable Connection Between 100BASE-T4 Nodes (FIG. 22)

This example highlights a connection between two 100BASE-T4 auto-detect capable stations. In this case it is assumed that each station supports 100BASE-T4 as its highest common denominator technology ability.

At this time the 100BASE-T4 technology ability can proceed through its own ability-specific link integrity test. This test can then do a specific test to insure that the two pairs of cable not used for auto-detect signalling are intact. In one aspect of the present invention, redundant transmissions are relied upon to ensure that the transmitted 16-bit pattern is correctly received by the remote station. That is, the remote station must receive an identical 16-bit pattern three times in a row before the acknowledgement pattern is transmitted. The acknowledgement pattern is the same 16-bit word with the acknowledge bit set. The reception of 2 out of 3 acknowledgement patterns completes the handshake. Thus, it is assured that the correct configuration information is exchanged.

The present invention provides an efficient mechanism for point-to-point communication that is efficient in terms of the amount of logic gates required. Regardless of the number of technology abilities supported, a total of 3 state machines, 6 timers, 3 counters, and some peripheral logic is needed. An analysis of the architecture shows that the design will require approximately 400 cells to implement. In addition, the present invention has been architected as a simple mechanism which allows easy comprehension by silicon suppliers.

It should be noted that this level of complexity remains fixed as new technologies emerge and need to coexist with the growing installed based of RJ-45 LANs. Alternative schemes that require separate and complex state machines for each pattern will be more complex and expensive to implement, especially as new LAN options are added.

The present invention can maintain compatibility when new options are added. As new CSMA/CD-compatible LAN technologies enter the market a reserved bit may be assigned to each technology. The new technology will be inserted into an updated priority table, as detailed in the Data Bit Field description. The relative hierarchy of the existing technologies need not change, thus providing backward compatibility. In preferred embodiments, the reserved bits are forced to zeros. This guarantees that devices implemented using the current priority table will be forwarded compatible with future devices using an updated priority table.

The present invention allows a station to advertise its complete set of CSMA/CD capabilities in one burst, a feature referred to as its "parallel advertising" capability. Advertising the complete set of capabilities in one pass allows a station to immediately discover all capabilities in one pass and thus immediately discover all capabilities of the remote station. These capabilities can then be saved for passage to a management agent.

In accordance with a further embodiment, although a pair of stations default to their highest common denominator capability, other modes of interoperation may exist. For a variety of reasons, the network management agent may wish to reconfigure the link.

Protocol Arbitration and Resolution Algorithm

In accordance with a further embodiment of the present invention, a Protocol Arbitration and Resolution Algorithm (PARA) algorithm allows for arbitration and resolution for capabilities within a given protocol and, further, between the protocols themselves until a common protocol and ability are identified. If no common ability is identified, then the link will not be established.

SOLUTION 1

Figure 23A:
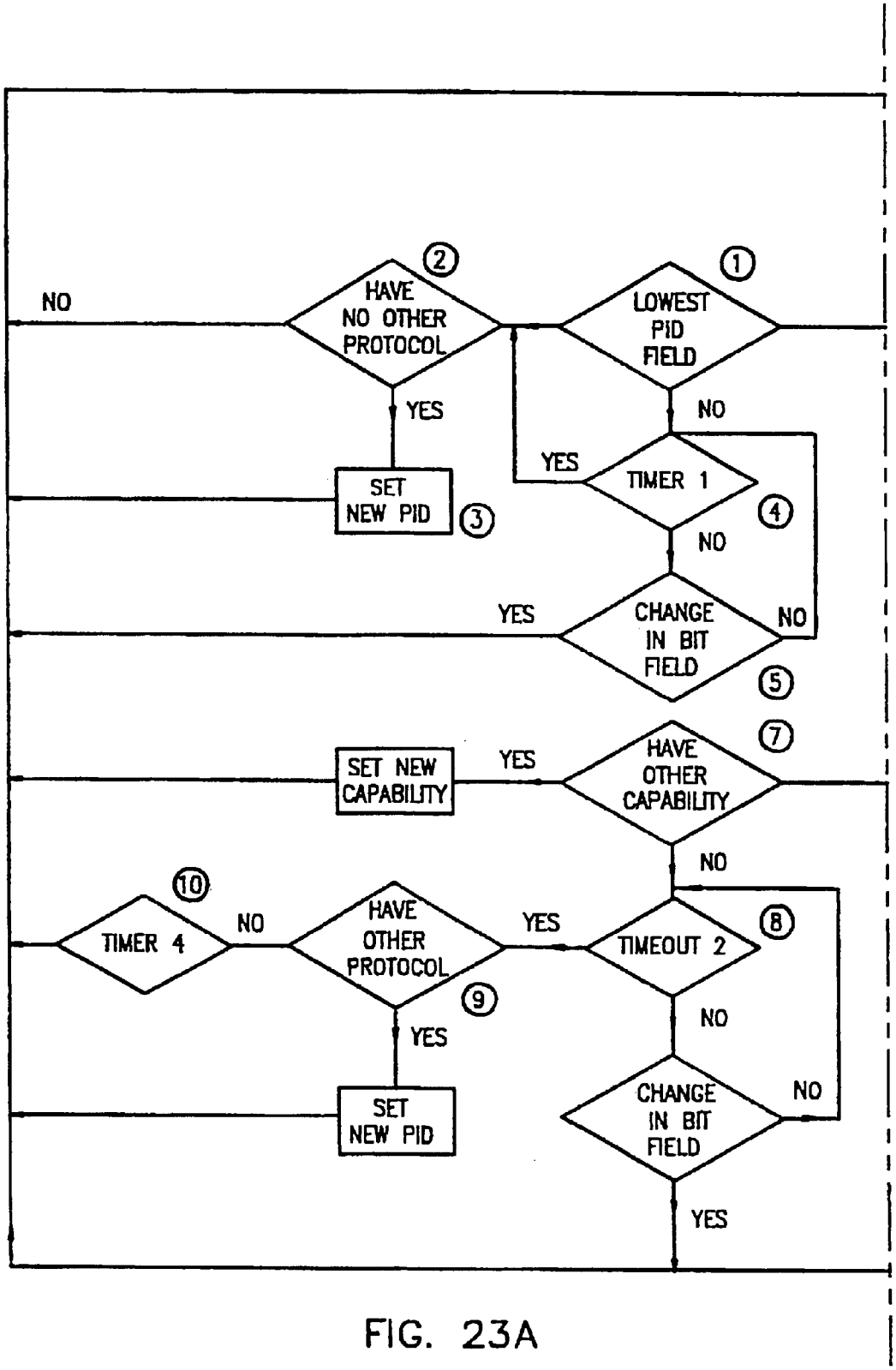
Figure 23B:
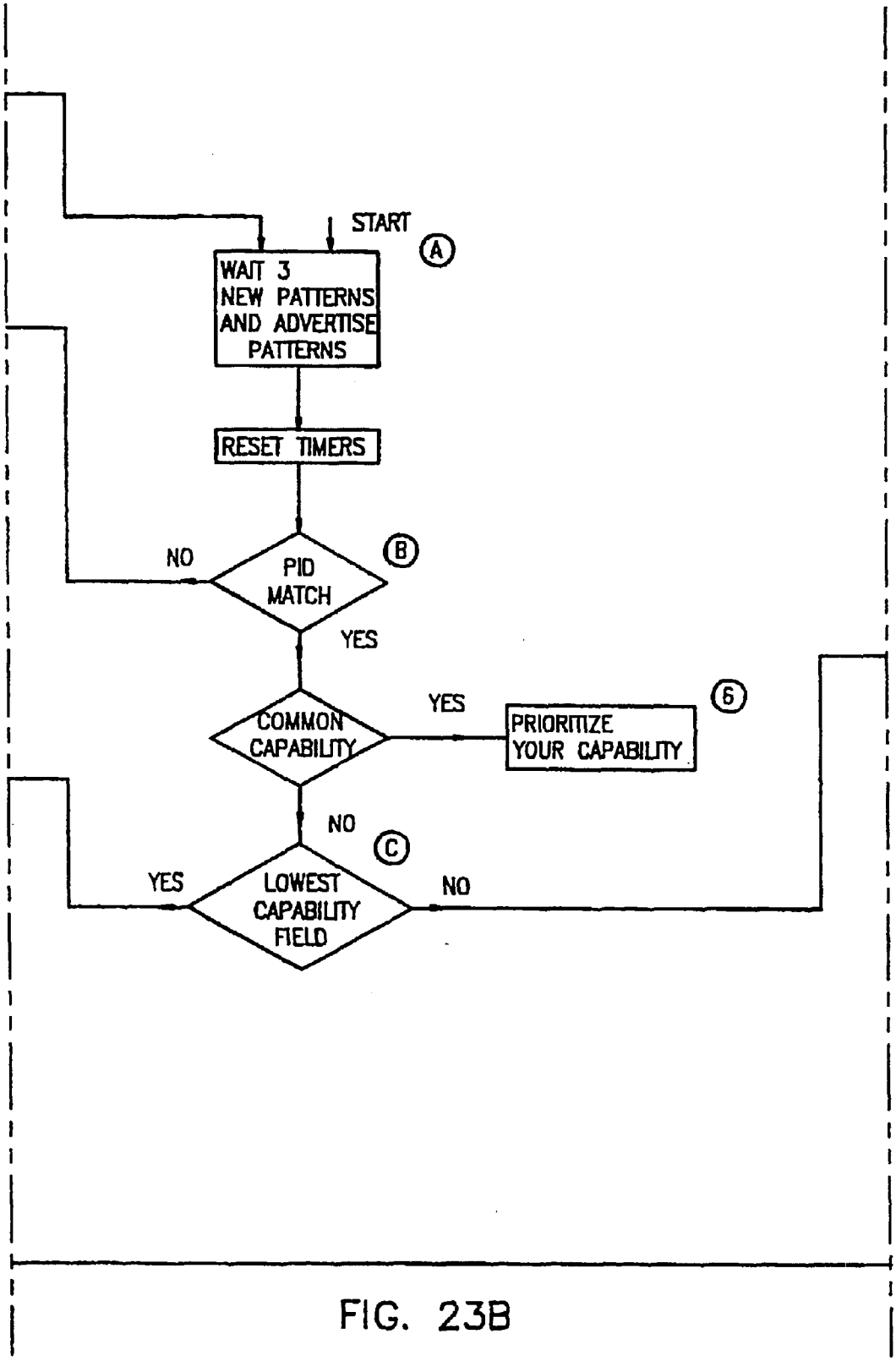
Figure 23C:
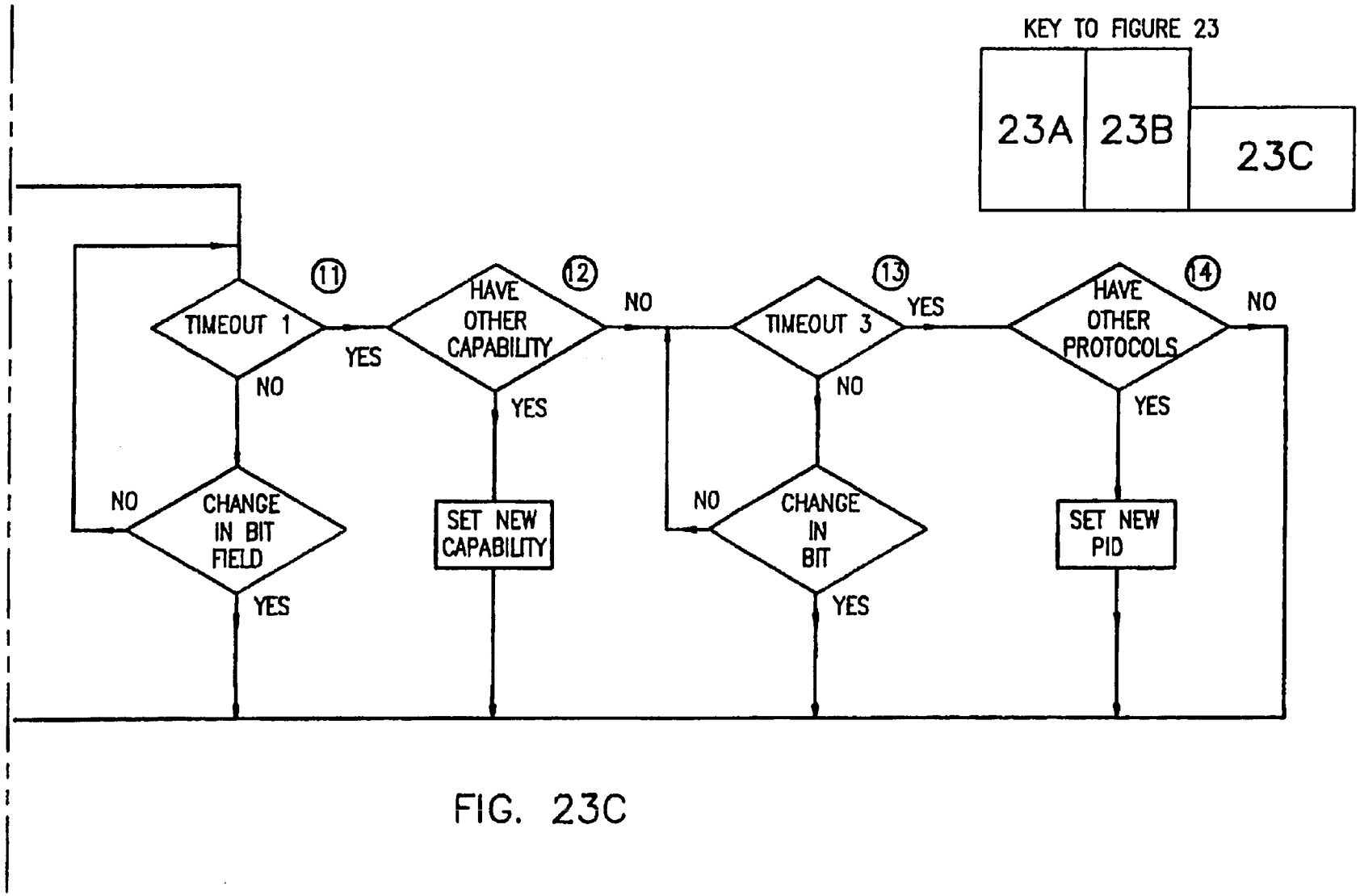

The PARA's shown in flow-chart form in FIG. 23.

Start of Algorithm (label A):

On the reception of 3 consecutive and identical link code words (label A) all the four timers in the PARA are reset (label A). Protocol Identifiers Do Not Match (label B)

If the Protocol Identifiers (PID's) do no match (label B) then it will be verified if the local node can support other protocols (label 2). If another PID can be supported (label 2) then it will be set (label 3) in the 16 bit link code word or else no change will be made to the PID. Control returns back to the beginning of the algorithm (label A). If the PID of the local node is not the lowest in the negotiating pair, then the local node will wait until the timer 1 (Slave_code_word_Change_timer) is done (label 4) for the other node to change its PID and advertise. If no change is observed in the link code word, then it knows that the other node is incapable of protocol arbitration and becomes the arbitration master (i.e., jumps to label 2). If there is a change in the link code word the local node knows that the link partner changed the PID and will have to renegotiate (label 5) and hence will return control back to beginning of the algorithm (label A). (Note: this accommodates for devices with multiple protocols with no protocol arbitration function and also for devices with multiple protocols but with the arbitration function disabled manually or by software).

Protocol Identifiers Match (label B):

If the protocol identifier's (PID) match (label B) then the capability fields of local node and its link partner are compared. If there are common capabilities then the highest common denominator amongst the common capabilities is chosen as specified in NYway (label 6).

If the PID's match and there are no common abilities then both the link partners will evaluate to see who has the lowest ability field (label C).

Lower Ability With PID Match (label C)

If the local node has the lowest ability, then it will be verified if it has other abilities (label and if found true the new capability or abilities can be set in the 16 bit link code word and return to beginning of algorithm. On the other hand if no other abilities are present then the local node will wait until timer 2 (Master_ability_change_timer) is done (label 8) giving time for the remote end (label 11) to advertise ability bits which it might not have previously advertised. If there is no change in the link code word, then the given PID is exhausted and hence a new PID will be set and negotiation will start at the beginning of the algorithm (label A).

Higher Ability With PID Match (label C)

In this case the remote link partner will be the negotiation master. Local node (label 11) will wait until timer 1 (Slave_code_word_change_timer) is done, to let the master change the ability bits and advertise the link code word. If there is a change in the bit field before this timer is done, then the master is still in control and negotiating. If no change is seen when the timer is done then the local node takes initiative/control from the remote master temporarily (label 12). The local node sets additional ability bits in the link code word if it has any previously unadvertised abilities it might want to advertise now. Control will be transferred to the beginning of the algorithm. On the other hand if it does not have any new ability bits to advertise then it will wait until the timer 3 (Slave_Negotiation_timer) is done (label 13). Before the timer 3 is done the remote master waits until its timer 2 (Master_ability_change_timer) is done, knows that all the feasible ability matching options are exhausted in both the nodes and hence tries to change its PID as described in the section above (label 9) before losing the Negotiation master privilege. If the remote master has no PID arbitration capability, it will yield mastership to the local node. When the timer 3 (Slave_Negotiation_timer) is done at the local end the local node takes up negotiation control and advertises a new PID if it is capable.

| | | |
|---|---|---|
| Timer 1: | Slave_code_word_change_timer | 11 × 16 = 176 ms |
| Timer 2: | Master_code_word_change_timer<br>Master_ability_change_timer | 22 × 16 = 352 ms |
| Timer 3: | Slave_Negotiation_timer | 33 × 16 = 528 ms |
| Timer 4: | Master_Negotiation_timer | 36 × 16 = 576 ms. |

The following is an example for the application of "Protocol Arbitration and Resolution Algorithm" described above.

The following example shows how two systems can find a common protocol and a common set of capabilities. Assume a link with two endpoints, called X and Y. These Endpoints have the following protocols and abilities:

Endpoint X:

Protocol 1:
Abilities A B C

Protocol 3:
Abilities G H I

Endpoint Y:

Protocol 2:
Abilities D E F

Protocol 3:
Abilities I J K

Each protocol can represent a different encoding scheme, transmission rate, or access mechanism. Each ability can represent different configurations, modes of operation, or optional abilities.

Assume that X initially advertises Protocol 1, abilities A, B, C, (represented by the notation 1-ABC), and Y advertises 2-DEF. Since these protocols are different, they can not interoperate (label B). Since X is advertising a protocol with the smallest encoded value, it is X's responsibility to select a new protocol (X:label 2, Y:label 4). Since X can not support Protocol 2, it will advertise Protocol 3. When X advertises Protocol 3, it decides that it would prefer to use Abilities G or H, and will initially only advertise 3-GH (X:label 4; Y:label 4).

Endpoint Y, now being the endpoint with the lowest encoded value for protocol, has two options—if it were capable of communicating using protocol 1, it could advertise it, forcing X to return to protocol 1, or, as in this case, it will advertise protocol 3-IJK (Y is willing to use any of its capabilities).

The protocols now match, but the intersection of the two sets of abilities is empty. If we assume that when the abilities (advertised by Y) are encoded that 3-IJK will represent a lower value than 3-GH (advertised by X), it will be endpoint Y's responsibility to change capabilities. Endpoint Y has no other options, and makes no changes (X:label 11; Y:label 8).

Endpoint X reaches a timeout 1 (i.e., when timer 1 or slave_code_word_change_timer is done), realizing that Y is unable to proceed, so X will change its advertisement (X:label 12) to include the additional ability of I (control transfer afterwards to X:label A; Y:label A).

X's advertisement is now 3-GHI, which contains the common element 1 with Y's advertisement of 3-IJK, allowing the completion of arbitration (X:label 6; Y:label 6).

If endpoint X had no other capabilities (i.e., X has only abilities 3-GH), it too would make no changes to its capabilities, allowing timeout2 (i.e., timer 2 or Master_ability_change_timer is done) to be reached by endpoint Y. Upon reaching this timeout2, Y has the opportunity to change to another protocol. In this case, there are no other protocols to be tried, and Y will make no changes to its advertisement.

A third timeout (timer 3 or Slave_negotiation_timer is done) is reached by X, indicating that Y was unable to select a new protocol, giving X the opportunity to select a new protocol. This mechanism allows X to initially ignore one of Y's protocol until X determined that there were no other common protocols.

SOLUTION II

This is a second method to achieve the same results but the arbitration is not done until all the protocol capabilities and technology abilities are exchanged between the two link partners.

Figure 24:
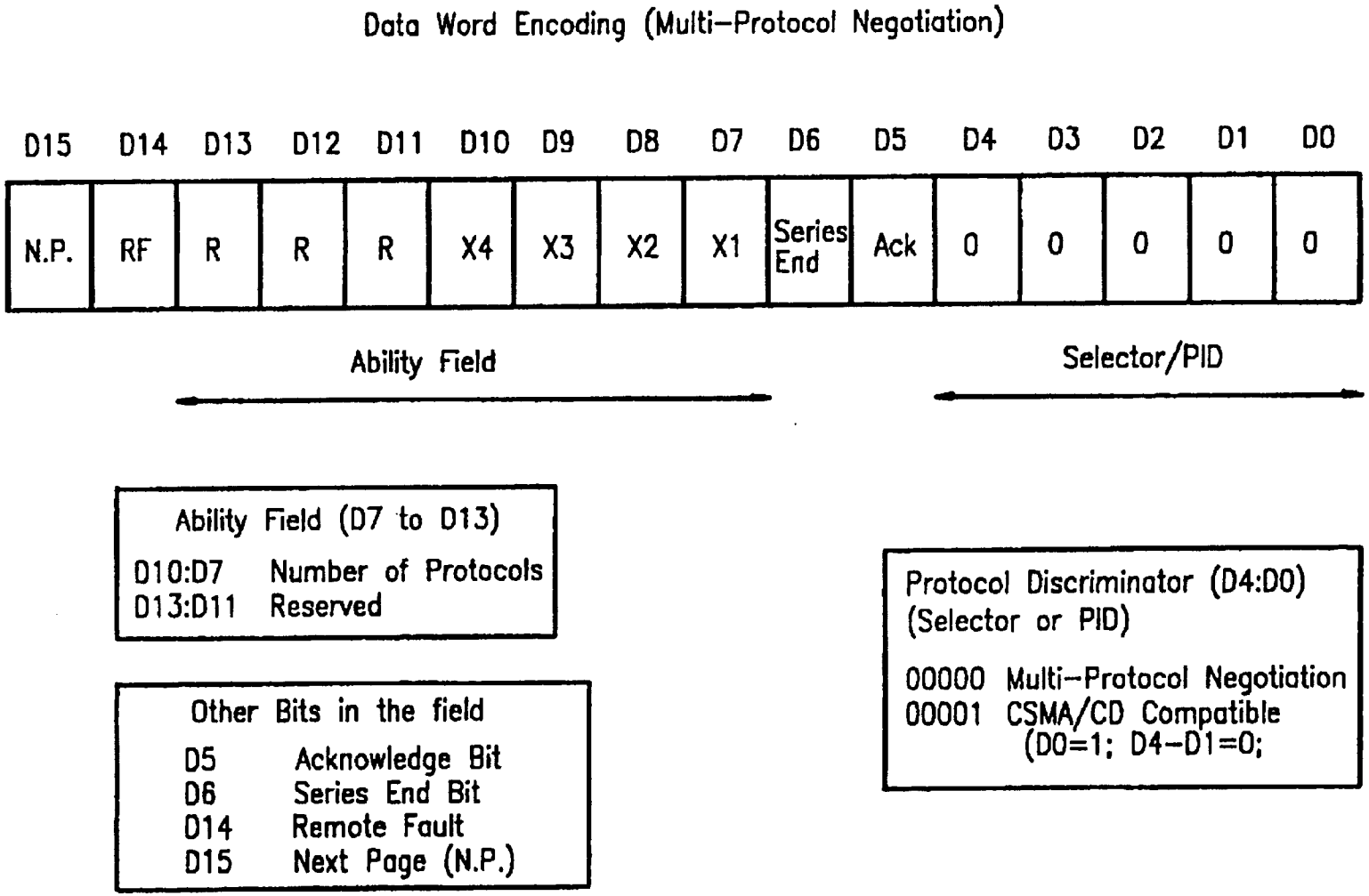
FIG. 24 shows a bit definition for a PID selector word.

The bits A7-A0 in the link code word in FIG. 6 have different definitions for different PID's or selector values in the link code word (D4-D0). A bit definition for a new PID/selector value of 00000 is defined and is used to initiate negotiation across devices with multiple protocols. The bit definition in this case is defined in FIG. 24. The next page bit can be used to transfer vendor ID.

The link partners X and Y using this scheme for negotiation is described below:

Node X sends the link code word with selector/PID set to 00000, ack=0, series end bit=0, and a four bit binary encoded value of the number of protocols supported (to node Y).

If Node Y is not multiprotocol capable, then it will keep sending the link code word with the only PID it supports or can handle. On sensing this, Node X will identify that Node Y is not multiprotocol capable and will advertise with the same PID as node Y, if X can handle that particular protocol. If there are common technology abilities between Node X and Node Y, then a link will be established. If Node X is not capable of the protocol advertised by Node Y, then a link cannot be established.

If Node Y is multiprotocol capable, then it also responds with PID=00000, the number of protocols it can support, and other information about itself through the link code word. As specified in the earlier portion of this description, the ack bit is set on the reception of 4–6 consecutive and consistent link code words. Both nodes begin to transmit their capabilities starting with the lowest PID value they support until all of the protocol capabilities, along with the technology ability bits, are transmitted. It is possible that one of the nodes with fewer protocol abilities can finish its transmission ahead of its link partner. In such a case, it will begin transmitting PID=00000 with the series end bit set to a "1". The node that is lagging will soon catch up and will also begin transmitting PID=00000 and series end bit=1. Since both modes have advertised the end of transmission, this signifies the end of the capability exchange between the two nodes. (If all the protocol information received matches the binary encoded number of protocols identified in the first code word transmission, then there is no loss of information. Otherwise, the transmission will begin again.) From the beginning to the end of this negotiation with PID=00000, NWay will not configure to the highest common denominator in any protocol. That is, it will be in a partial freeze state.

Now that all of the protocol abilities are known, the media access units (MAU's) in both the nodes will look up a common prioritization table to identify the highest common denominator common to both nodes.

The prioritization table gives the order in which a node prefers to configure based on the protocols and the abilities within that protocol. For example:

1) Protocol A, ability 1
2) Protocol B, ability 5
3) Protocol A, ability 2
4) Protocol B, ability 2

The abilities within a protocol can be mixed in the prioritization table with the abilities from other protocols. This gives tremendous flexibility beyond simply prioritizing the protocols. This also allows network management to mask out certain abilities such that the chosen ability is the most optimal for the kind of service (like data transmission, reliable and isochronous for video/multimedia or lowest cost service etc.) required.

Figure 25:
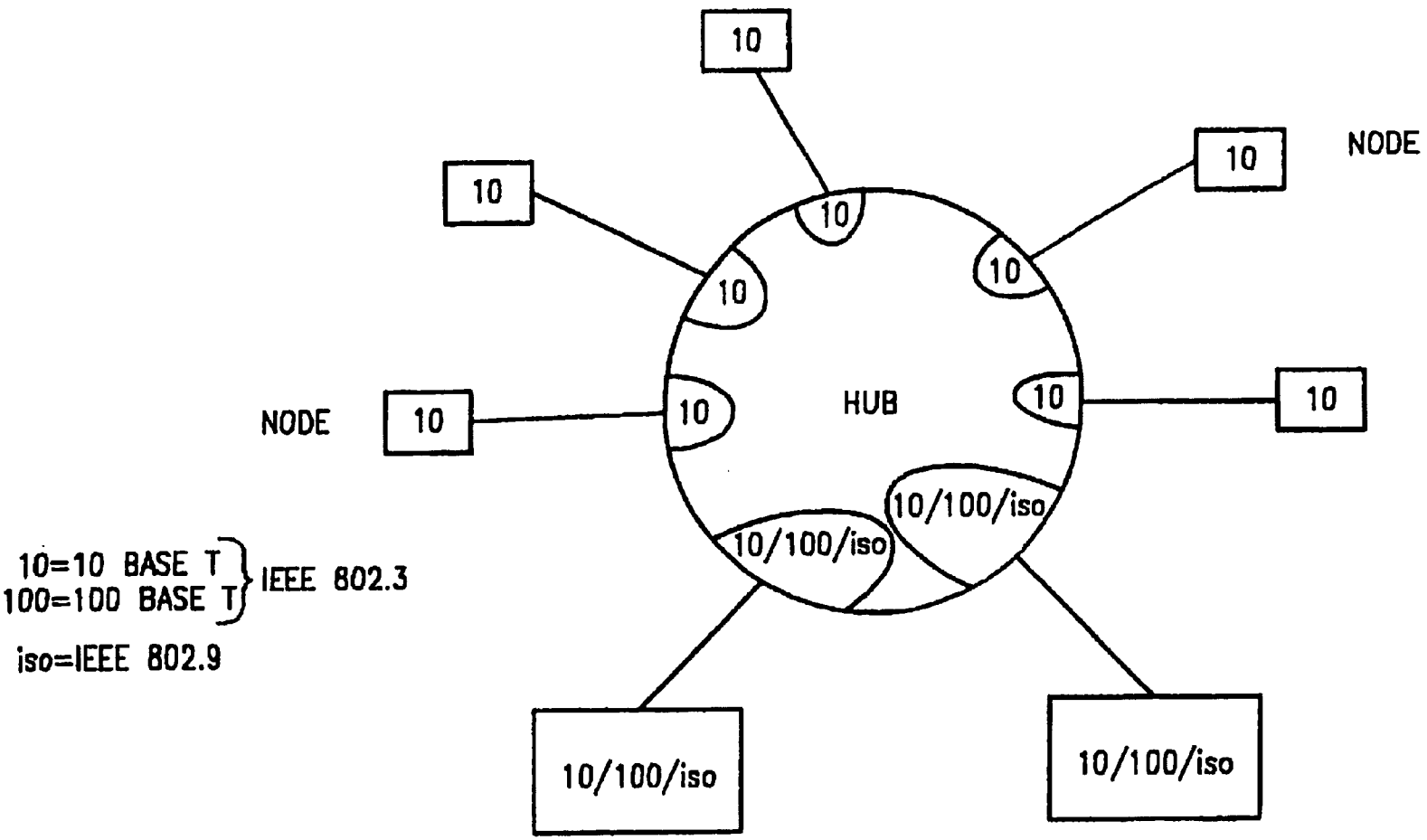
FIG. 25 schematically illustrates an example of a small network.

Thus, it can be seen that the protocol resolution and arbitration algorithm allows nodes supporting multiple protocols (e.g as shown in FIG. 25) to coexist on a single network. It allows a node (e.g. a computer) to scan the protocol capabilities of other nodes connected to it on the network and configure to a common and desirable protocol configuration.

It should be understood that various alternatives to the embodiments of the invention described herein may be employed in practicing the invention. In particular, the invention has application beyond local area networks; it has application wherever there is communication between two stations.

It is intended that the following claims define the scope of the invention and that methods and apparatus within the scope of these claims and their equivalents be covered thereby.

What is claimed is:

1. An apparatus for matching a transmission protocol of a first station of a point-to-point data communication network to a transmission protocol of a second station of the network, comprising:

protocol detecting means associated with the first station for detecting an advertised available protocol from the second station that indicates a protocol in which the second station is capable of operating;

protocol comparing means associated with the first station for comparing the indicated protocol of the second station to a protocol in which the first station is capable of operating;

priority determining means for determining, when the result of the protocol comparison is negative, which of the first station and the second station is a higher priority station for protocol negotiation;

protocol advertising means associated with the first station for advertising, to the second station, a protocol of the first station;

advertised protocol changing means associated with the first station for changing the advertised protocol of the first station when the priority determining means determines that the first station is the higher priority station for protocol negotiation; and waiting means for waiting for an indication of a change in condition of the second station when the priority determining means determines that the second station is the higher priority station for protocol negotiation.

2. The apparatus of claim 1, wherein the advertised available protocol of the second station is encoded by the second station into a first protocol datum transmitted from the second station to the first station, wherein the detecting means detects the available protocol of the second station from the first protocol datum.

3. The apparatus of claim 2, wherein the protocol advertising means encodes the protocol of the first station into a second [configuration] *protocol* datum for transmission to the second station.

4. The apparatus of claim 3, wherein the first protocol datum is transmitted from the second station to the first station within a burst of fast link pulses.

5. The apparatus of claim 1, wherein the indication of a change in condition of the second station is a change in the advertised available protocol of the second station.

6. The apparatus of claim 1, wherein the advertised protocol changing means includes "available protocol" determining means for determining whether there are available protocols, other than the advertised protocol of the first station, in which the first station is capable of operating, and wherein the advertised protocol changing means changes the advertised protocol of the first station only when the "available protocol" determining means determines that there are other available protocols.

7. The apparatus of claim 1, wherein the priority determining means is a first priority determining means, and further comprising:

capability detecting means associated with the first station for detecting an advertised available capability from the second station that indicates a capability in which the second station is capable of operating;

capability comparing means associated with the first station for comparing the indicated capability of the second station to a capability in which the first station is capable of operating;

second priority determining means for determining, when the result of the capability comparison is negative, which of the first station and the second station is a higher priority station for capability negotiation;

capability advertising means associated with the first station for advertising, to the second station, a capability of the first station;

advertised capability changing means associated with the first station for changing the advertised capability of the first station when the second priority determining means determines that the first station is the higher priority station for capability negotiation, wherein the waiting means is also for waiting for an indication of a change in condition of the second station when the second priority determining means determines that the second station is the higher priority station for capability negotiation.

8. The apparatus of claim 7, wherein the advertised capability changing means includes "available capability" determining means for determining whether there are available capabilities, for the advertised protocol of the first station and other than the advertised capability of the first station protocol of the first station, in which the first station is capable of operating, and wherein the advertised capability changing means changes the advertised capability of the first station only when the other capability determining means determines that there are other available capabilities.

9. The apparatus of claim 8, wherein the waiting means is also for waiting for a change in condition of the second station when the "available capability" determining means determines that there are no available capabilities for the advertised protocol of the first station other than the advertised capability of the first station, in which the first station is capable of operating.

10. The apparatus of claim 9, wherein the advertised protocol changing means is also for changing the advertised protocol of the first station when the waiting means determines that there is no indication of a change in condition of the second station within a predetermined amount of time after the "available capability" determining means determines that there are no available capabilities for the advertised protocol of the first station other than the advertised capability of the first station protocol of the first station, in which the first station is capable of operating.

11. The apparatus of claim 10, wherein the advertised protocol changing means includes "available protocol" determining means for determining whether there are available protocols, other than the advertised protocol of the first station, in which the first station is capable of operating, and wherein the advertised protocol changing means changes the advertised protocol of the first station only when the other protocol determining means determines that there are other available protocols.

12. The apparatus of claim 11, wherein the waiting means is further for waiting a predetermined time before the protocol detecting means associated with the first station detects an advertised available protocol from the second station.

13. The apparatus of claim 7, wherein the advertised capability changing means is further for changing the advertised capability of the first station when the waiting means determines that there is no indication of a change in condition of the second station with a predetermined amount of time after the second priority determining means determines that the second station is the higher priority station for capability negotiation.

14. The apparatus of claim 13, wherein the advertised capability changing means includes "available capability" determining means for determining whether there are available capabilities, for the advertised protocol of the first station other than the advertised capability of the first station protocol of the first station, in which the first station is capable of operating, and wherein the advertised capability changing means changes the advertised capability of the first station only when the "available capability" determining means determines that there are other available capabilities.

15. The apparatus of claim 14, wherein the waiting means is also for waiting for a change in condition of the second station when the "available capability" determining means determines that there are no available capabilities for the advertised protocol of the first station other than the advertised capability of the first station protocol of the first station, in which the first station is capable of operating.

16. The apparatus of claim 15, wherein the advertised protocol changing means is also for changing the advertised protocol of the first station when the waiting means determines that there is no indication of a change in condition of the second station within a predetermined amount of time after the "available capability" determining means determines that there are no available capabilities for the advertised protocol of the first station and other than the advertised capability of the first station protocol of the first station, in which the first station is capable of operating.

17. The apparatus of claim 16, wherein the advertised protocol changing means includes "available protocol" determining means for determining whether there are available protocols, other than the advertised protocol of the first station, in which the first station is capable of operating, and wherein the advertised protocol changing means changes the advertised protocol of the first station only when the "available protocol" determining means determines that there are other available protocols.

*18. An apparatus for matching a transmission protocol of a first station of a point-to-point data communication network to a transmission protocol of a second station of the network, comprising:*

*protocol detecting means associated with the first station for detecting an advertised available protocol from the second station that indicates a protocol in which the second station is capable of operating;*

*protocol comparing means associated with the first station for comparing the indicated protocol of the second station to a protocol in which the first station is capable of operating;*

*priority determining means for determining, when the result of the protocol comparison is negative, which of the first station and the second station is a higher priority station for protocol negotiation;*

*protocol advertising means associated with the first station for advertising, to the second station, a protocol of the first station, with the protocol advertising means including apparatus which transmits a code word to the second station, with the advertised protocol of the first station being defined by a first group of at least two contiguous bits of the code word;*

*advertised protocol changing means associated with the first station for changing the advertised protocol of the first station when the priority determining means determines that the first station is the higher priority station for protocol negotiation; and*

*waiting means for waiting for an indication of a change in condition of the second station when the priority determining means determines that the second station is the higher priority station for protocol negotiation.*

*19. The apparatus of claim 18 wherein the first group of at least two contiguous bits includes at least five contiguous bits of the code word.*

*20. The apparatus of claim 19 wherein the code word includes consecutive bits D0 through D15 and wherein the at least five contiguous bits includes bits D0 through D4.*

*21. The apparatus of claim 18 wherein code word is transmitted by the first station using link pulses.*

*22. The apparatus of claim 21 wherein the link pulses include a burst of fast link pulses.*

*23. The apparatus of claim 18 wherein the transmission protocols include at least one protocol selected from a group of protocols which includes encoding schemes, transmission rate and access mechanism.*

*24. The apparatus of claim 18 wherein the indication of a change in condition of the second station is a change in the advertised available protocol of the second station.*

*25. The apparatus of claim 18 wherein the advertised protocol changing means includes "available protocol" determining means for determining whether there are available protocols, other than the advertised protocol of the first station, in which the first station is capable of operating, and*

*wherein the advertised protocol changing means changes the advertised protocol of the first station only when the "available protocol" determining means determines that there are other available protocols.*

*26. The apparatus of claim 18 wherein the priority determining means is a first priority determining means, and further comprising:*

*capability detecting means associated with the first station for detecting an advertised available capability from the second station that indicates a capability in which the second station is capable of operating;*

*capability comparing means associated with the first station for comparing the indicated capability of the second station to a capability in which the first station is capable of operating;*

*second priority determining means for determining, when the result of the capability comparison is negative, which of the first station and the second station is a higher priority station for capability negotiation;*

*capability advertising means associated with the first station for advertising, to the second station, a capability of the first station, with the capability advertising means including the apparatus which transmits the code word to the second station, with the advertised capability being defined by a second group, different from the first group, of at least two contiguous bits of the code word;*

*advertised capability changing means associated with the first station for changing the advertised capability of the first station when the second priority determining means determines that the first station is the higher priority station for capability negotiation,*

*wherein the waiting means is also for waiting for an indication of a change in condition of the second station when the second priority determining means determines that the second station is the higher priority station for capability negotiation.*

*27. The apparatus of claim 26 wherein the code word is transmitted by the first station using link pulses.*

*28. The apparatus of claim 27 wherein the link pulses include a burst of fast link pulses.*

*29. The apparatus of claim 26 wherein the first group of at least two contiguous bits includes at least five contiguous bits of the code word.*

*30. The apparatus of claim 29 wherein the second group of at least two contiguous bits includes at least five contiguous bits of the code word.*

*31. The apparatus of claim 30 wherein the code word includes consecutive bits D0 through D15 and wherein the first group of at least five contiguous bits includes bits D0 through D4 and wherein the second group of at least five contiguous bits includes bits D6 through D10.*

*32. The apparatus of claim 26 wherein the advertised capability changing means includes "available capability" determining means for determining whether there are available capabilities, for the advertised protocol of the first station and other than the advertised capability of the first station protocol of the first station, in which the first station is capable of operating, and*

*wherein the advertised capability changing means changes the advertised capability of the first station*

*only when the other capability determining means determines that there are other available capabilities.*

*33. The apparatus of claim 32 wherein the waiting means is also for waiting for a change in condition of the second station when the "available capability" determining means determines that there are no available capabilities for the advertised protocol of the first station other than the advertised capability of the first station, in which the first station is capable of operating.*

*34. The apparatus of claim 33 wherein the advertised protocol changing means is also for changing the advertised protocol of the first station when the waiting means determines that there is no indication of a change in condition of the second station within a predetermined amount of time after the "available capability" determining means determines that there are no available capabilities for the advertised protocol of the first station other than the advertised capability of the first station protocol of the first station, in which the first station is capable of operating.*

*35. The apparatus of claim 34 wherein the advertised protocol changing means includes "available protocol" determining means for determining whether there are available protocols, other than the advertised protocol of the first station, in which the first station is capable of operating, and*

*wherein the advertised protocol changing means changes the advertised protocol of the first station only when the other protocol determining means determines that there are other available protocols.*

*36. The apparatus of claim 35 wherein the waiting means is further for waiting a predetermined time before the protocol detecting means associated with the first station detects an advertised available protocol from the second station.*

*37. The apparatus of claim 26 wherein the advertised capability changing means is further for changing the advertised capability of the first station when the waiting means determines that there is no indication of a change in condition of the second station with a predetermined amount of time after the second priority determining means determines that the second station is the higher priority station for capability negotiation.*

*38. The apparatus of claim 37 wherein the advertised capability changing means includes "available capability" determining means for determining whether there are available capabilities, for the advertised protocol of the first station other than the advertised capability of the first station protocol of the first station, in which the first station is capable of operating, and*

*wherein the advertised capability changing means changes the advertised capability of the first station only when the "available capability" determining means determines that there are other available capabilities.*

*39. The apparatus of claim 38 wherein the waiting means is also for waiting for a change in condition of the second station when the "available capability" determining means determines that there are no available capabilities for the advertised protocol of the first station other than the advertised capability of the first station protocol of the first station, in which the first station is capable of operating.*

*40. The apparatus of claim 39 wherein the advertised protocol changing means is also for changing the advertised protocol of the first station when the waiting means determines that there is no indication of a change in condition of the second station within a predetermined amount of time after the "available capability" determining means determines that there are no available capabilities for the advertised protocol of the first station and other than the advertised capability of the first station protocol of the first station, in which the first station is capable of operating.*

*41. The apparatus of claim 40 wherein the advertised protocol changing means includes "available protocol" determining means for determining whether there are available protocols, other than the advertised protocol of the first station, in which the first station is capable of operating, and*

*wherein the advertised protocol changing means changes the advertised protocol of the first station only when the "available protocol" determining means determines that there are other available protocols.*

*42. An apparatus for matching a transmission protocol of a first station of a point-in-point data communication network to a transmission protocol of a second station of the network, comprising:*

*protocol detecting means associated with the first station for detecting an advertised available protocol from the second station that indicates a protocol in which the second station is capable of operating;*

*protocol comparing means associated with the first station for comparing the indicated protocol of the second station to a protocol in which the first station is capable of operating;*

*priority determining means for determining, when the result of the protocol comparison is negative, which of the first station and the second station is a higher priority station for protocol negotiation;*

*protocol advertising means associated with the first station for advertising, to the second station, a protocol of the first station, with the protocol of the first station including at least one protocol selected from a group of protocols which includes encoding schemes, transmission rates and access mechanism;*

*advertised protocol changing means associated with the first station for changing the advertised protocol of the first station when the priority determining means determines that the first station is the higher priority station for protocol negotiation; and*

*waiting means for waiting for an indication of a change in condition of the second station when the priority determining means determines that the second station is the higher priority station for protocol negotiation.*

*43. The apparatus of claim 42 wherein the priority determining means is a first priority determining means, and wherein the protocol advertising means includes apparatus which transmits a code word to the second station, with the advertised protocol for the first station being defined by a first group of at least two contiguous bits of the code word, with said apparatus further comprising:*

*capability detecting means associated with the first station for detecting an advertised available capability from the second station that indicates a capability in which the second station is capable of operating;*

*capability comparing means associated with the first station for comparing the indicated capability of the second station to a capability in which the first station is capable of operating;*

*second priority determining means for determining, when the result of the capability comparison is negative, which of the first station and the second station is a higher priority station for capability negotiation;*

*capability advertising means associated with the first station for advertising, to the second station, a capability of the first station, with the capability advertising means including the apparatus which transmits the code word to the second station, with the advertised capability being defined by a second group, different*

*from the first group, of at least two contiguous bits of the code word;*

*advertised capability changing means associated with the first station for changing the advertised capability of the first station when the second priority determining means determines that the first station is the higher priority station for capability negotiation,*

*wherein the waiting means is also for waiting for an indication of a change in condition of the second station when the second priority determining means determines that the second station is the higher priority station for capability negotiation.*

* * * * *